June 27, 1967  SHINJI YAMAMOTO ET AL  3,328,761
CHARACTER READING SYSTEM BY DETECTION BETWEEN ELECTRON
SCANNING LINES AND CHARACTERS
Filed May 20, 1964  6 Sheets-Sheet 1

INVENTOR.
Shinji Yamamoto
Sho Narita
BY
Western & Western

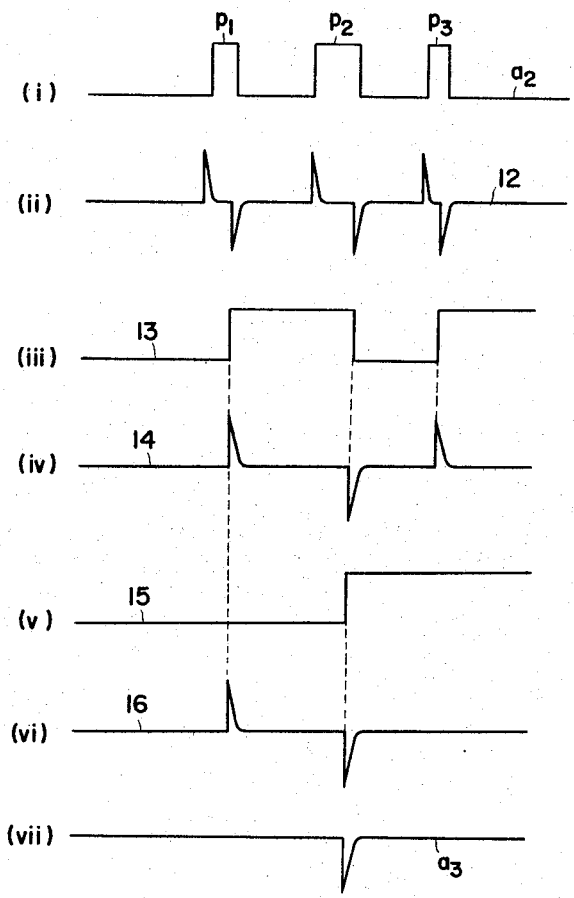

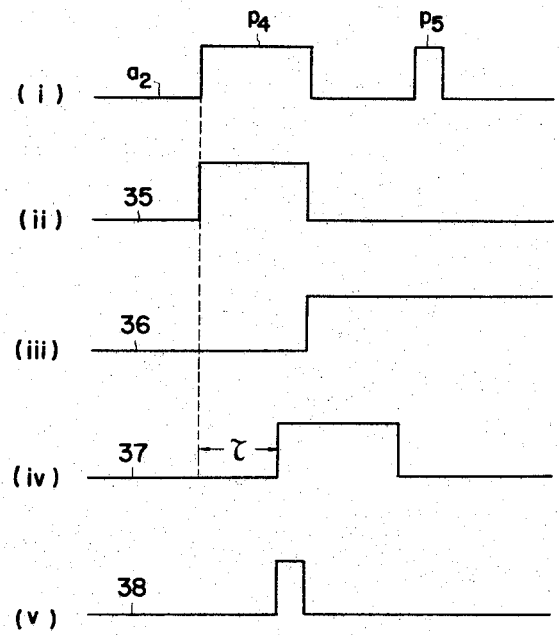

United States Patent Office 3,328,761
Patented June 27, 1967

3,328,761
CHARACTER READING SYSTEM BY DETECTION BETWEEN ELECTRON SCANNING LINES AND CHARACTERS
Shinji Yamamoto, Kokubunji-machi, Kitatama-gun, Tokyo-to, and Sho Narita, Kodaira-shi, Japan, assignors to Kabushiki Kaisha Hitachi Seisakusho, Tokyo-to, Japan, a joint-stock company
Filed May 20, 1964, Ser. No. 368,780
Claims priority, application Japan, May 30, 1963, 38/27,664
2 Claims. (Cl. 340—146.3)

This invention relates to electronic methods and means for reading recorded characters and more particularly to character reading systems of the type wherein characters are scanned by a plurality of scan lines for character reading, and electrical pulse train signals are generated when the scan lines and characters cross each other.

It is a general object of the invention to provide a new electronic method and system for reading characters affording simple and economical construction of apparatus and rapid and accurate operation.

The foregoing object and other objects and advantages as will presently become apparent have been achieved by the present invention, which, briefly described, resides in a character reading system characterized by a novel arrangement and combination of parts adapted to accomplish the operation of scanning characters by means of a plurality of scan lines, thereby converting the characters into electrical signals and, at the same time, dividing these signals into a plurality of blocks, detecting the manner in which the number of electrical signals, that is, pulses, generated in the scan lines varies in each block, and thereby accomplishing recognition of the characters.

By means of this invention, it is possible for the first time to first divide a plurality of scanning lines which scan a character to be recognized by a plurality of scanning line groups in the order in which they are arranged, then to compare the number of pulses in each of these groups which had been produced in each of said plurality of scanning lines with the number of pulses produced in the adjacent scanning lines and, thereafter, to combine the output signals of each group when equal signals are produced continuously for each group and to assign a code for each of these output signals, thereby recognizing the character with the pulse code trains thus produced. In so doing, the character reading system according to this invention is capable of simplifying to an extreme extent the encoding system, providing not only economical advantages but ease of reading and discriminating signals.

The specific nature, principle, and deails of the invention will be more clearly apparent by reference to the following detail description with respect to a preferred embodiment of the invention, taken in conjunction with the accompanying drawings in which:

FIG. 5 is a pulse time chart indicating various output signals in the circuit shown in FIG. 4;

Figure 4:
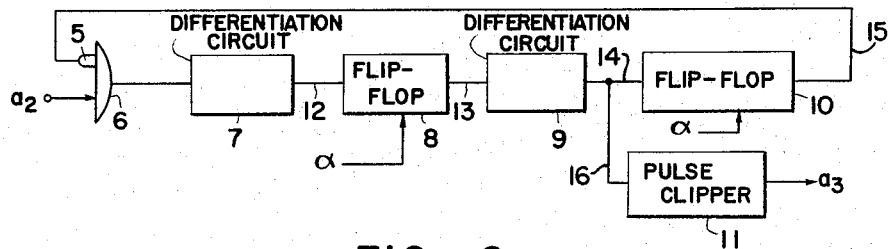
FIG. 4 is a block diagram showing the details of one unit of the flip-flop and differentiation circuit of the apparatus shown in FIG. 3.
Figure 7A:
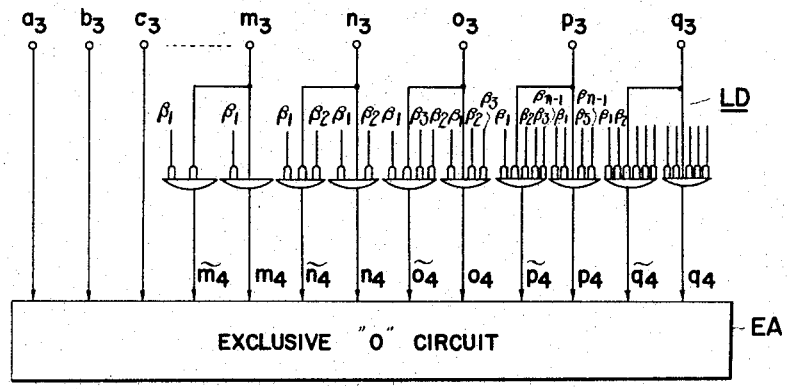
Figure 7B:
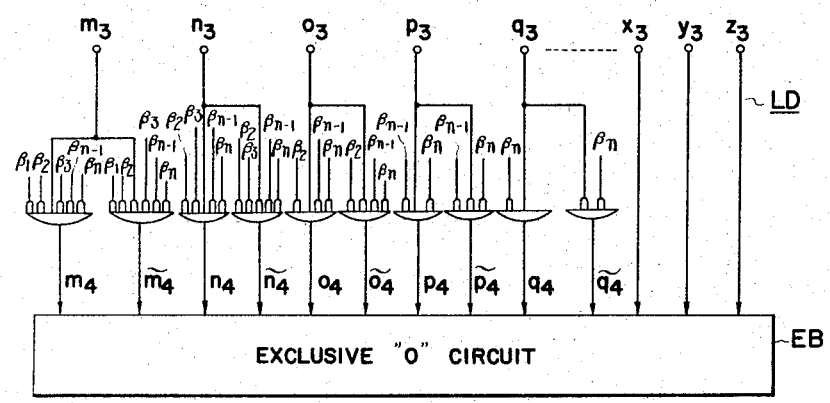
Figure 8A:
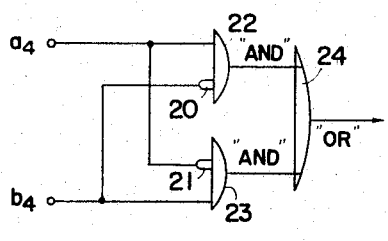
Figure 8B:
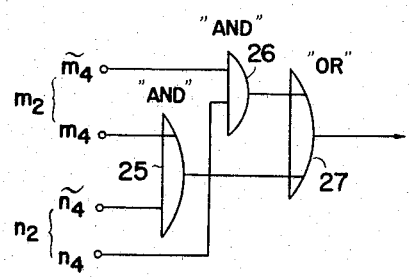
Figure 8C:
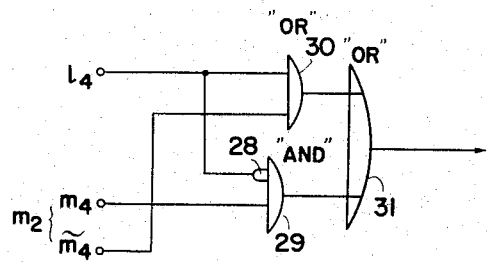
Figure 10:
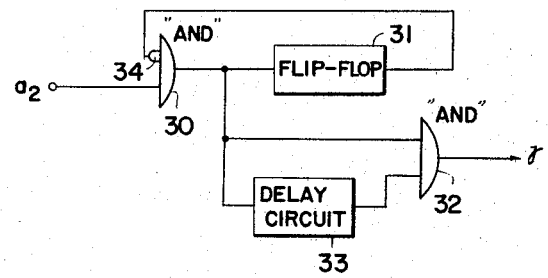

FIGS. 7(a) and 7(b) are diagrams respectively indicating the details of the centerline detection circuit and the A–B block dividing circuit of the circuit shown in FIG. 4;

FIGS. 8(a), 8(b), and 8(c) are connection diagrams showing the details of respective units of exclusive "or" circuits;

FIG. 9 is a tabular representation showing an encoding chart of signals corresponding to the arabic numerals from one to zero;

FIG. 10 is a block diagram indicating the details of one unit of a long pulse detecting circuit;

FIG. 11 is a pulse time chart indicating the output signals at various parts of the circuit shown in FIG. 10; and FIG. 12 is a tabular representation showing an encoding chart indicating one example of codes in another embodiment of the invention.

FIG. 13 is a diagram showing the period of character reading, explaining the "on" state ($a$) and the start and end of intersection ($b$).

In the embodiment of the invention shown in the drawings which illustrate the case of application of the invention to reading of arabic numerals, two groups of phototransistors are used as a photoelectric converter. The signals from that group of phototransistors are divided into two sets of signals, namely, those obtained from the part above a centerline passing substantially through the center of a character (hereinafter referred to as "A signals") and those obtained from the part below said centerline (hereinafter referred to as B signals). The signals of these two sets are respectively arranged and consolidated, thereby to accomplish recognition of the aforesaid numerals.

Figure 1:
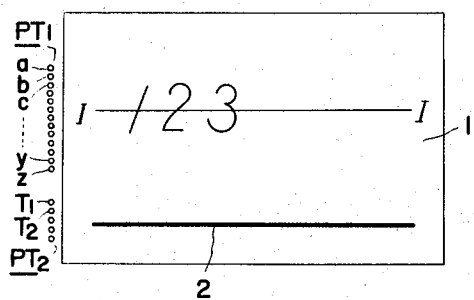
FIG. 1 is a planar view indicating a card on which characters to be read have been recorded and an arrangement of phototransistors for converting these characters into electrical signals.

Referring to FIG. 1 showing an example of a card 1 bearing numerals to be read, a plurality of these numerals are inscribed horizontally with their centers aligned with a centerline I—I. For detection of the position of this centerline I—I, a line 2 for detecting position is inscribed therebelow and substantially parallel thereto.

The card I is fed leftwardly as viewed in FIG. 1, and in its path a first group of phototransistors $a$, $b$, $c$, . . . $y$, $z$ for detecting the numerals on the card and a second group of phototransistors $T_1$, $T_2$ . . . for detecting the line 2 are provided. While the number of phototransistors in the first group is here chosen to be 26 for the reason of convenience, this number may be suitably selected in accordance with the number and kind of characters to be recognized. The centerline I—I is of a fineness such that it will not be sensed by a phototransistor.

Figure 3:
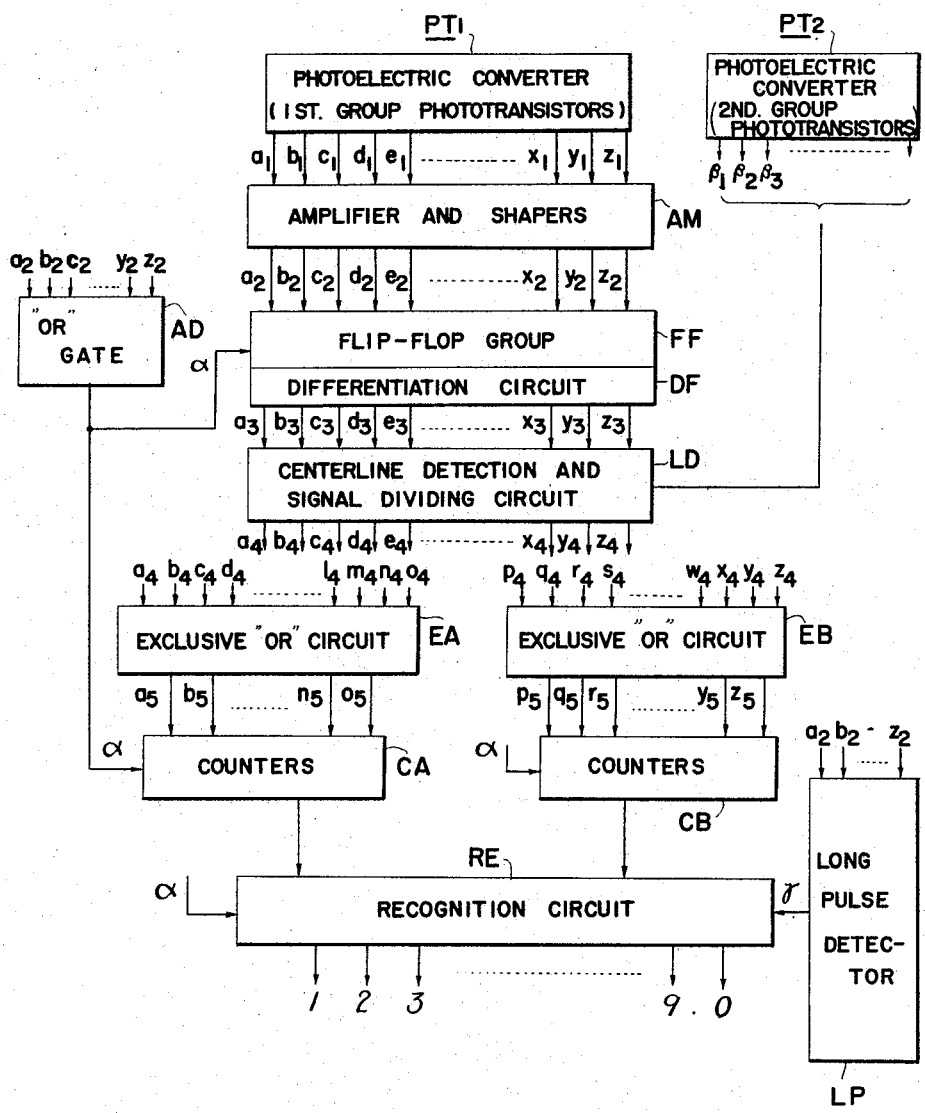
FIG. 3 is a block diagram indicating the essential composition and arrangement of an embodiment of the reading apparatus according to the invention.

The general arrangement and composition of the entire reading circuit is shown in FIG. 3. The input section of this circuit comprises essentially a photoelectric signal converter $PT_1$ having the first group of phototransistors $a$, $b$, $c$, . . . $y$, $z$ and a photoelectric converter $PT_2$ for detecting the centerline having the second group of phototransistors $T_1$, $T_2$ . . .

Output signals $a_1$, $b_1$, $c_1$ . . . from the phototransistors $a$, $b$, $c$, . . . of the photoelectric converter $PT_1$ are introduced into a group of amplifiers and shaping circuits designated collectively by AM, where said signals are suitably shaped in waveform and amplified into signals $a_2$, $b_2$, $c_2$, . . . having several pulses as indicated in FIG. 5($i$). These signals $a_2$, $b_2$, $c_2$, . . . enter a flip-flop group FF and then enter differentiation circuits DF, where signals having zero or one pulse are converted into "0" signals, and those having two or more pulses are converted into "1" signals, whereby signals $a_3$, $b_3$, $c_3$, . . . are obtained.

The aforementioned signals $a_2$, $b_2$, $c_2$, . . . are introduced into an "OR" gate AD to compose a signal $\alpha$ indicating the start and finish of reading of one numeral. This signal $\alpha$ is applied to the flip-flop group FF to control accurately the operation of the reading system.

When a part of a character reaches the scanning surface by taking the logical summation of $a_2$–$c_2$ out of each element, the output of the "OR" gate attains the "on" state, and when the character disappears, it attains the "off" state. As shown in FIG. 13($a$), the period during which AD is in "on" state is the period during which the character appears. Accordingly, when this output is differentiated, as shown in FIG. 13($b$), the generating point of the positive pulse is the commencing point of intersection of the charatcer and the scanning lines, and the generating point of the negative pulse is the terminal point of the intersection.

The signal obtained by the "OR" gate AD performs the following actions which will be explained in greater detail hereinbelow:

(1) it performs resetting (termination of intersection) of the flip-flop group FF shown in FIG. 3;

(2) it performs opening of the gate (start of intersection) of the counters CA and CB, also shown in FIG. 3;

(3) it establishes the discrimination output time for the recognition circuit RE in FIG. 3.

The signal conversion in the flip-flop group FF will now be described in greater detail. The deails of one unit of this flip-flop FF and the differentiation circuit DF are shown in FIG. 4. An input signal, for example, $a_2$ (this description applying also to other signals), is introduced as an input into an "AND" gate 6 together with an inhibited signal (herein defined as a "1" signal changed into an "0" signal, and an "0" signal changed into a "1" signal) resulting from the inhibiting by a "NOT" circuit 5 of a feedback signal. The resutling output is applied to a differentiation circuit 7, the output of which is introduced, together with the aforesaid signal $\alpha$, into a flip-flop circuit 8. The output of the flip-flop circuit 8 is introduced into a differentiation circuit 9. The output of this differentiation circuit 9 is fed back by way of a flip-flop circuit 10 to the "NOT" circuit 5 before the "AND" circuit 6 as aforementioned and, at the same time, enters a plus pulse clipper 11 to become a signal $a_3$.

The output signal currents at various parts of the unit shown in FIG. 4 are indicated in FIG. 5. FIG. 5($i$) indicates the signal $a_2$ which has a number of pulses (three, in the case illustrated) $P_1$, $P_2$, and $P_3$ in accordance with the number of lines of the numeral character crossed by the scanning lines of the phototransistors. This signal $a_2$ is transformed by the differentiation circuit 7 into a signal 12 as indicated by FIG. 5($ii$) when a feedback signal is not introduced as an input into the "NOT" circuit 5. When this signal is introduced as an input into the next flip-flop circuit, it becomes a signal 13 as indicated in FIG. 5($iii$). This signal 13 is transformed by the differentiation circuit 9 into a signal 14 as indicated in FIG. 5($iv$), which signal 14 is transformed by the flip-flop 10 into a signal 15 as indicated in FIG. 5($v$). This signal 15 is inhibited by the "NOT" circuit 5, and, since it enters as an input together with the signal $a_2$ into the "AND" gate 6, the the pulse subsequent to the third pulse in the signal $a_2$ disappear. Accordingly, the signal actually emerging from the differentiation circuit 9 is a signal 16 as indicated in FIG. 5($vi$), which signal 16 is transformed by the plus pulse clipper 11 into a signal $a_3$.

That is, when the number of pulses in the signal $a_2$ is zero or one, the pulses in the signal $a_3$ disappear; when the number of pulses in the signal $a_2$ is two, one pulse remains in the signal $a_3$; and when there are three or more pulses in the signal $a_2$, these surplus pulses are eliminated by the feedback circuit and disappear, so that one pulse remains in the signal $a_3$ as in the case when there are two pulses in the signal $a_2$. Therefore, if a signal having no pulse is taken as an "0" signal, and a signal having one pulse is taken as a "1" signal, an "0" signal will be generated when the number of points at which the scan lines of the phototransistors $a$, $b$, $c$, . . . cross a character to be read is zero or one, and a "1" signal will be generated when said number is two or more.

The manner in which the signals are divided as described above may be illustrated with respect to FIG. 2 which shows the numeral 3 to be converted into signals. The signals $b_3$, $c_3$, $w_3$, $x_3$, and $y_3$ corresponding to the transistors $b$, $c$, $w$, $x$, and $y$ in the portions near the upper and lower ends of the numeral become "1" signals. The signals $a_3$ and $z_3$ and $d_3$, $e_3$, . . . $s_3$, $t_3$, $u_3$, and so forth, corresponding to the end transistors $a$ and $z$ and the center portion transistors $d$, $e$, . . . $s$, $t$, $u$, and so forth, become "0" signals.

Referring again to FIG. 3, the signals $a_3$, $b_3$ . . . are introduced as inputs into centerline detection and AB signal diving circuits LD together with signals $\beta_1$, $\beta_2$ . . . sent from the photoelectric converter $PT_2$ for centerline detection. The output signals $a_4$, $b_4$ . . . from the circuits LD are divided into two groups of A signals and B signals, the A signals being introduced into a first exclusive "OR" circuit EA, and the B signals being introduced into a second exclusive "OR" circuit EB. This aspect of the system and its operation will now be described hereinbelow in greater detail.

Figure 6:
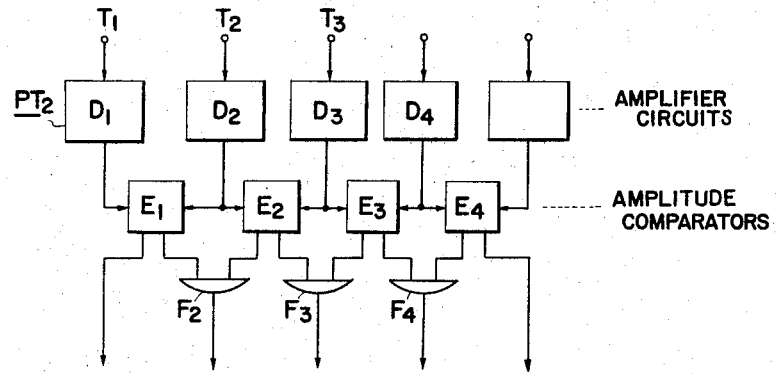
FIG. 6 is a block diagram showing the details of composition and arrangement of a photoelectric converter for centerline detection suitable for use in the circuit shown in FIG. 4.

Referring to FIG. 6, which represents the photoelectric converter $PT_2$, the output signals from the transistors $T_1$, $T_2$ . . . are respectively amplified in amplifier circuits $D_1$, $D_2$ . . . The outputs of adjacent amplifier circuits $D_1$, $D_2$ . . . are respectively compared by means of amplitude comparators $E_1$, $E_2$. . . . Each of these amplitude comparators is provided with two input terminals for selectively introducing two of the output signals from the amplifier circuits $D_1$ $D_2$ . . . , and two output terminals. When the amplitude of any one of the incoming signals to these input terminals is larger than that of the other, "1" signal is produced from one of the output terminals positioned on the side of the input terminals to which the larger signal is introduced, and "0" signal is produced from the other output terminal positioned on the side of the input terminal to which the smaller signal is introduced.

The output signals from adjacent amplitude comparators $E_1$, $E_2$ . . . are introduced as inputs respectively into "AND" gates $F_2$, $F_3$ . . .

As is apparent from FIG. 1, of the transistors $T_1$, $T_2$ . . . , the transistor scanning over the line 2 produces a signal, and the other transistors do not produce any signals. Consequently, a "1" signal is produced from the comparator E connected to the amplifier circuit D corresponding to that transistor from which a signal has been produced, and from only the "AND" gate into which this "1" signal has been introduced as input is a "1" signal produced. That is, if the output signals from the "AND" gates $F_2$, $F_3$ . . . are denoted by $\beta_1$, $\beta_2$ . . . , only one signal $\beta$ corresponding to the transistor T which has scanned over the line 2 is a "1" signal, and the remaining signals $\beta$ are all "0" signals.

Figure 2:
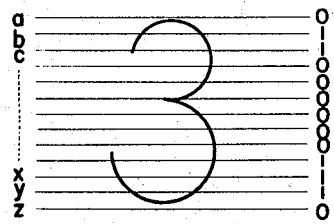
FIG. 2 is a planar view to be referred to in a description of signals picked up by the phototransistors in the case when the arabic numeral "3" is to be read.

Referring to FIG. 7, which shows the aforementioned centerline detection and AB signal dividing circuits LD, the signals $a_3$, $b_3$, and $c_3$ corresponding to the aforementioned transistors $a$, $b$, and $c$ of the numeral in FIG. 2 have been predetermined to become A signals and, accordingly, are introduced as input into the exclusive "OR" circuit EA for receiving A signals. The signals $z_3$, $y_3$, $x_3$ . . . corresponding to the lower end transistors $z$, $y$, $x$ . . . have been predetermined to become B signals and accordingly, are introduced as input into the exclusive "OR" circuit EB for receiving B signals. The signals $m_3$, $n_3$, $o_3$ . . . $p_3$, $q_3$ of the intermediate region which become either A signals or B signals depending on their positions on the card 1 are introduced as input, together with the aforementioned signals $\beta_1$, $\beta_2$ . . . , into both exclusive "OR" circuits EA and EB. The details of this aspect of the system and its operation will now be described hereinbelow.

For introduction as input into the circuit EA: the signal $m_3$ and its "NOT" signal are respectively subjected to logical "AND" operation with the "NOT" signal of the signal $\beta_1$ to obtain signals $m_4$ and $\tilde{m}_4$; the signal $n_3$ and its inhibited signal are respectively subjected to logical "AND" operation with the inhibited signals of the signals $\beta_1$ and $\beta_2$ to obtain signals $n_4$ and $\tilde{n}_4$; the signal $o_3$ and its inhibited signal are respectively subjected to logical "AND" operation with the inhibited signals of the signals $\beta_1$, $\beta_2$ and $\beta_3$ to obtain signals $o_4$ and $\tilde{o}_4$; and, thereafter, as the signals $p_3$, $q_3$ . . . corresponding to the lower transistors are approached, the inhibited signals of the logical "AND" signals $\beta_1$, $\beta_2$ . . . are progressively increased in a similar manner.

For introduction as input into the circuit EB: the signal $q_3$ and its inhibited signal are respectively subjected to logical "AND" operation with the inhibited signal of the signal $\beta_n$ to obtain signals $q_4$ and $\tilde{q}_4$; the signal $p_3$ and its inhibited signal are respectively subjected to logical "AND" operation with the inhibited signals of the signals $\beta_n$ and $\beta_{n-1}$ to obtain signals $p_4$ and $\tilde{p}_4$; the signal $o_3$ and its inhibited signal are respectively subjected to logical "AND" operation with the inhibited signals of the signals $\beta_n$, $\beta_{n-1}$, and $\beta_{n-2}$ to obtain signals $o_4$ and $\tilde{o}_4$; and, thereafter, as the signals $n_3$, $m_3$ . . . corresponding to the lower transistors are approached, the inhibited signals of the logical "AND" signals $\beta_n$, $\beta_{n-1}$ . . . are progressively increased in a similar manner.

By the above described operational method, if the signal $\beta_3$ is a "1" signal, signals $\beta_1$, $\beta_2$ . . . will be inhibited before entering into the "AND" gate. Therefore, only this signal $\beta_3$ becomes an "0" signal, the other signals becoming "1" signals. Accordingly, in the case of signals to be introduced into the circuit EA, only the signals $m_3$, $n_3$ . . . which are not subjected to logical "AND" operation with the signal $\beta_3$ are made available signals $m_4$, $\tilde{m}_4$, $n_4$, $\tilde{n}_4$ ($m=1$ or $\tilde{m}_4=1$, $n_4=1$ or $\tilde{n}_4=1$), and the signals which have been subjected to logical "AND" operation with the signal resulting from the inhibition of the signal $\beta_3$ are made unavailable signals $o_3$, $\tilde{o}_3$, $p_3$, $\tilde{p}_3$ ($o_3=\tilde{o}_3=p_3=\tilde{p}_3=$ . . . $=0$).

That is, in the above case, the output signals of the transistors which have scanned the part of the character below the centerline I—I corresponding to line 2 shown in FIG. 2 are distinguished from the signals of the transistors which have scanned the part above said centerline and are neglected in the exclusive "OR" circuit as will be described hereinafter.

In the case of signals to be introduced as input into the circuit EB, the logical "AND" operations are carried out with the signal $\beta$ progressively increasing in the sequential direction reverse to that of the case of the circuit EA, that is, from signal $\beta_n$. Accordingly, the relationships described above are reversed.

That is, in this case, the output signals of the transistors which have scanned the part of the character above the centerline I—I corresponding to the line 2 are distinguished from the signals of the transistors which have scanned the part below said centerline and are neglected in the exclusive "OR" circuit as will be described hereinafter.

Single units of an exclusive "OR" circuit suitable for use in the system of the invention are shown in detail in FIG. 8. The unit shown in FIG. 8(A) is a circuit which compares the signals $a_4$, $b_4$, . . . $z_4$, $y_4$ . . . which have been introduced as input directly into the exclusive "OR" circuit EA or EB without being introduced into an "AND" gate with the aforementioned signals $\beta_1$, $\beta_2$. . . . This circuit operates to subject each of its adjacent signals and a "NOT" signal resulting from inhibition of the other signal to a logical "AND" operation and to subject the resulting signals to a logical "OR" operation. For this purpose, the circuit comprises inhibiting means 20 and 21, "AND" gates 22 and 23, and an "OR" gate 24.

The unit shown in FIG. 8(B) is a circuit which compares the signals $m_4$, $\tilde{m}_4$, $n_4$, $\tilde{n}_4$ . . . $q_4$, $\tilde{q}_4$ resulting from the aforedescribed logical "AND" operation with the signals $\beta_1$, $\beta_2$. . . . This circuit operates to subject each of its adjacent signals and the inhibited signals (denoted by the symbol $\sim$ thereabove) to a logical "AND" operation and to subject the resulting signals to a logical "OR" operation. For this purpose, the circuit comprises "AND" gates 25 and 26 and an "OR" gate 27.

The unit shown in FIG. 8(C) is a circuit which compares those of the signals not subjected to logical "AND" operation with the aforementioned signals $\beta_1$, $\beta_2$ . . . and those of the signals which have been subjected to such operation, that is, a circuit which compares the signal $l_4$ with $m_4$ and $\tilde{m}_4$ and signal $r_4$ with $q_4$ and $\tilde{q}_4$. In this case, the signal $l_4$ is subjected to logical "AND" operation with the signal $m_4$, and the signal $m_4$ is subjected to logical "AND" operation with the inhibited signal of the signal $l_4$, the resulting signals being subjected to logical "OR" operation. For this purpose, this circuit is provided with an inhibiting means 28, "AND" gates 29 and 30, and an "OR" gate 31.

In these exclusive "OR" circuits EA and EB, in the case wherein adjacent signals among the series of signals $a_4$, $b_4$ . . . are the same, the output signals becomes "0," and only in the case wherein different signals are adjacent, the output signal becomes "1." Consequently, by this circuit, from the signals among the signals $a_4$, $b_4$ . . . which change from "0" to a "1" or from "1" to "0", "1" signal is produced, and from the row of other "1" and "0" signals, an "0" signal is produced in each of all cases.

Referring again to FIG. 3, the output signals $a_5$, $b_5$ . . . from the exclusive "OR" circuit groups EA and EB are introduced as input into counters CA and CB which count only the respective "1" signals of said signals so introduced. Accordingly, in these circuits, the number of signals from among the aforementioned signals $a_4$, $b_4$ . . . which change from "0" to "1" or, inversely, from "1" to "0" is counted. Each numeral read in this manner is represented by the combination of two numbers, which are introduced as input into a recognition circuit RE, where the read numeral is recognized, and a signal corresponding thereto is recomposed and sent out. RE is a series of logic circuits to determine logic conditions according to FIGURE 9. A signal $\alpha$ is sent from the "OR" gate AD to this recognition circuit RE and to the counters CA and CB to verify the start and completion of reading of each numeral.

The tabular representation in FIGURE 9 indicates a series of signals $a_4$, $b_4$ . . ., which correspond to the numerals 0 to 9, and which have been sent out from the aforementioned centerline detection and AB signal dividing circuits LD, said signals being separated into A and B signals with a part where the equal signals are in a row and reduced to a single signal. As is apparent from this table, when reading the numerals 1 and 7 and reading the numerals 4 and 0, the same signals are obtained. Therefore, only in each of these cases, the two signals cannot be distinguished.

In order to distinguish these pairs of signals, the aforementioned signals $a_2$, $b_2$ . . . are sent to a long pulse detector LP, and the output signal $\tau$ thereof is sent to the recognition circuit RE.

One unit of this long pulse detector LP is shown in detail in FIG. 10. A signal, for example, signal $a_2$, is introduced as input into an "AND" gate 30, the output of which is applied as input to a flip-flop circuit 31, an "AND" gate 32, and a delay circuit 33. The output of the flip-flop circuit 31 is fed back to an inhibiting circuit 34 and "AND" gate 30, and the output of the delay circuit 33 is applied to the "AND" gate 32.

By the arrangement of this unit circuit, even if two or more pulses, for example, $p_4$ and $p_5$ as shown in FIG. 11($i$), exist in the signal $a_2$, a signal 35 as shown in FIG. 11($ii$) is produced as output from the "AND" gate 30 because the signal $a_2$ is subjected to logical "AND" operation in the "AND" gate 30 with the signal 35 as shown in FIG. 11 which results from the output of the flip-flop circuit 31 being fed back and inhibited by the inhibiting device 34. This signal 35 is delayed by the delay circuit 33 to become a signal 37 which is delayed by time $\tau$ relative to signal 35. The signal 35 is subjected to logical "AND" operation in the "AND" gate 32 with the signal 37, and when $p_4$ is a long pulse, the resulting signal becomes a signal 38 as shown in FIG. 11($v$).

When the numeral to be read, as in the case of 0 or 1, does not have a long part in the horizontal direction, there is no long pulse in the signals $a_2$, $b_2$. . . . Consequently, in this case, there is no instance at which the signals 36 and 37 simultaneously assume positive values, and these signals become zero under logical "AND" operation.

On the other hand, when the numeral to be read, as in the case of 4 or 7, has a long part in the horizontal direction, a pulse remains in each of the output signals $\tau$ resulting from signals $a_2$, $b_2$ . . . as indicated in FIG. 11. Accordingly, by sending this signal $\tau$ to the recognition circuit RE, it is possible to distinguish between the numerals 1 and 7 or 0 and 4.

It is to be observed that various changes and modifications of the invention as described above are possible. For example, while in the above described embodiment of the invention, several binary signals are divided into two groups of A signals and B signals, these signals may be divided into several groups of a number greater than two for accomplishing recognition. Furthermore, in the above described example, the transistors are adapted to scan from left to right, and the scanning range of the scanning lines covers the whole area of the character to be read. As another example, although the line 2 for center-line detection has been described above as being provided apart from the numeral to be read and as being detected by transistors which are separate from those for reading the numeral, the line 2 may be provided in the same part as the numeral and detected by the same transistors as those for reading the numeral. A further variation is scanning in the vertical direction instead of scanning in the horizontal direction as described above. Furthermore, the practice of the invention is not limited to use of only photoelectric converters such as phototransistors but may be extended to utilize magnetic means such as magnetic heads, with similar effectiveness.

The above described embodiment of the invention, for illustrative purposes, relates to an extremely simplified case wherein, of the pulse currents obtained, zero or one is caused to correspond to "0," and two or more are caused to correspond to "1" to produce binary signals.

The practice of this invention is not limited to the use of merely such binary signals. For example, by adopting an encoding method wherein zero or one pulse are encoded into "0," two pulses are encoded into "1," and three or more pulses are encoded into "2," recognition of an even greater number of characters is possible.

One example of such encoding and division of characters into three groups is indicated in FIG. 12. In the table of FIG. 12, the columns (I), (II), and (III) respectively indicate the designations of the corresponding divisions when each character is divided into the three parts of upper, center, and lower parts, and the characters A, C, . . . respectively indicate letters of an alphabet to be read.

Similarly, by dividing the number of pulses existing in one scanning line into suitable groups, the apparatus can be simplified, and, moreover, recognition operation of ample accuracy and reliability can be achieved. Accordingly, the present invention affords the arrangement of apparatus which is extremely advantageous for purposes such as the solution of economical problems.

By the practice of the present invention in the manner disclosed above, recognition of a character is accomplished through detection of the state of variation of signals within each block of said character, and character reading can be accomplished electrically in a rapid yet accurate manner. Furthermore, the present invention affords simplicity in the construction of apparatus and economical manufacture thereof and can be adapted even to reading of hand-written characters.

As mentioned briefly hereinabove, the details of the invention can be varied in numerous ways. Therefore, it should be understood that the foregoing disclosure relates principally to only a preferred embodiment of the invention and that it is intended to cover all such changes and modifications of the example of the invention herein chosen for the purposes of the disclosure, which do not constitute departures from the spirit and scope of the invention as set forth in the appended claims.

We claim:

1. In a character reading system of the type wherein each character to be read is scanned by a plurality of scan lines for character reading, and electrical pulse-train signals are generated when the scan lines intersect parts of the character, the combination comprising: means to divide said scan lines into a plurality of groups; means to compare, in each of said groups, the number of pulses produced in each scan line with the number of pulses produced in adjacent scan lines and to combine these numbers when said numbers are equal; means to encode output signals detected by said comparing means; means to combine signals encoded by said encoding means, for each said group of scan lines; and means to accomplish recognition of said character by pulse code trains thus produced.

2. The character reading system according to claim 1, wherein said encoding means comprises means to divide the number of pulses of the electric pulse-train signals into a plurality of classes, and means to assign one code to each of said classes in accordance therewith, whereby the signals of each scan line are encoded in accordance with the class to which the number of pulse-trains generated in each scan line belongs.

References Cited

FOREIGN PATENTS 820,283   9/1959   Great Britain.

DARYL W. COOK, *Acting Primary Examiner.*

MAYNARD WILBUR, J. E. SMITH, J. SCHNEIDER, *Assistant Examiners.*